United States Patent
Marly et al.

(10) Patent No.: US 9,200,525 B2
(45) Date of Patent: Dec. 1, 2015

(54) TURBOMACHINE BLADE INCIDENCE CONTROL SYSTEM AND TURBOMACHINE

(71) Applicant: SNECMA, Paris (FR)

(72) Inventors: Pascal Marly, Melun (FR); Denis Louis Bocquet, Bois le Roi (FR); Caroline Frantz, Maisons-Alfort (FR); Gilles Le Gouellec, Paris (FR)

(73) Assignee: SNECMA, Paris (FR)

( * ) Notice: Subject to any disclaimer, the term of this patent is extended or adjusted under 35 U.S.C. 154(b) by 658 days.

(21) Appl. No.: 13/654,830

(22) Filed: Oct. 18, 2012

(65) Prior Publication Data
US 2013/0101419 A1  Apr. 25, 2013

(30) Foreign Application Priority Data
Oct. 21, 2011  (FR) ........................ 11 59575

(51) Int. Cl.
*F01D 7/00* (2006.01)
*B64C 11/38* (2006.01)

(52) U.S. Cl.
CPC ............... *F01D 7/00* (2013.01); *B64C 11/385* (2013.01)

(58) Field of Classification Search
CPC ................................. F01D 7/00; B64C 11/385
See application file for complete search history.

(56) References Cited

U.S. PATENT DOCUMENTS

| 2,889,888 A * | 6/1959 | Fairhurst ................... 416/156 |
| 8,091,584 B2 * | 1/2012 | Marly .................... 137/625.68 |
| 2010/0135799 A1 * | 6/2010 | Morgan ....................... 416/44 |

FOREIGN PATENT DOCUMENTS

| EP | 2 192 307 A2 | 6/2010 |
| GB | 818611 A | 8/1959 |

OTHER PUBLICATIONS

French Preliminary Search Report issued Jun. 11, 2012 in Patent Application No. 1159575 with English Translation of Category of Cited Documents.
U.S. Appl. No. 14/472,929, filed Aug. 29, 2014, Laigle, et al.

* cited by examiner

*Primary Examiner* — Richard Edgar
*Assistant Examiner* — Brian O Peters
(74) *Attorney, Agent, or Firm* — Oblon, McClelland, Maier & Neustadt, L.L.P.

(57) ABSTRACT

Turbomachine blade incidence control system including a fluidic cylinder with a first and a second chamber and having a pressurized fluid network adapted to selectively supply pressurized fluid to the first and/or the second chamber, the fluid network having one fluid routing device having a first normal position and a second protection position. The fluidic cylinder includes a fluid inlet positioned to be in fluid communication with the first chamber when the fluidic cylinder is in the blocked position, the routing device being adapted to set up a fluid communication between the inlet and the second chamber when it is in the protection position and to inhibit the fluid supply to the inlet when it is in the normal position.

10 Claims, 3 Drawing Sheets

TURBOMACHINE BLADE INCIDENCE CONTROL SYSTEM AND TURBOMACHINE

TECHNICAL FIELD

The invention relates to the field of turbomachines and fluid control systems fitted on such turbomachines.

The thrust applied by a turbomachine in operation shall be adapted as a function of the situation of the aircraft on which it is installed. Thus, the thrust applied by the turbomachine must be different depending on whether the aircraft is on the ground, in flight or in its acceleration phase for takeoff.

One particular way in obtaining such a variation in the turbomachine thrust is to modify the incidence of the blades of the propeller depending on the airflow passing through said turbomachine. In one operating mode on the ground, the incidence of each blade may be very small (so-called "small pitch" range) relative to the incidence of the blades that the aircraft can tolerate during flight conditions, because this very small incidence could generate a drag that is prejudicial for controllability of the aircraft. Therefore the incidence of each blade is in a so-called "large pitch" range with high incidence, when the aircraft is in flight.

One known method of obtaining such a modification in the incidence of the blades of a turbomachine is to equip the turbomachine with a blade incidence control system.

Therefore, the invention is more particularly applicable to a turbomachine blade control system and a turbomachine.

STATE OF PRIOR ART

A turbomachine blade incidence control system usually comprises a fluidic cylinder adapted to modify the incidence of the blade by its displacement, and a pressurised fluid network to supply pressurised fluid to the fluidic cylinder.

The fluidic cylinder comprises a first chamber and a second chamber, with first and second fluid inlets respectively. The fluid network is adapted to selectively supply the first and/or the second chamber with fluid through the first and/or the second inlet. The selective supply to the first and/or second chamber is made using a pressurised fluid source from the fluid network with first and second pressurised fluid outlets in fluid communication with the first and second chambers respectively. Each fluid outlet supplies pressurised fluid at high pressure and fluid at low pressure alternately.

Thus, with such a system, the incidence of the blade is adjusted by supplying either the first or the second chamber with the pressurised fluid to move the fluidic cylinder.

One known method of securing the flight phase of an aircraft comprising a turbomachine making use of such a system and to limit risks of excursion of the turbomachine into the "small pitch" configuration range during this phase, is to adapt the control system to prevent such a transition.

The system must be capable of preventing modifications to the incidence of the blade beyond a predefined position corresponding to the "large pitch" configuration to limit risks of changing to the "small pitch" configuration that is only used on the ground.

To achieve this, as shown in FIG. 1, the control system comprises two fluid routing devices 120a, 120b in the fluid network, and each of the routing devices 120a, 120b is adapted to modify the fluid supply to the first chamber 231. Such a routing device 120a, 120b may for example be an electrically or mechanically controlled valve bringing parts of the pressurised fluid network into connexion with each other and/or by isolating some other parts of the network from the remainder of the fluid network.

Thus as shown in FIG. 1, the system comprises a first routing device 120a that is electrically controlled and a second routing device 120b that is mechanically controlled by the fluidic cylinder movement. The first and the second routing devices 120a, 120b each have a first and a second inlet orifice 121a, 122a, 121b, 122b and an outlet orifice 123a, 123b.

The configuration of the fluid network 100 is as follows:
 a first fluid outlet 111 from the fluid source 110 is in fluid communication with the first inlet orifices 121a, 121b of the first and second routing devices 120a, 120b,
 a second fluid outlet 112 from the fluid source 110 is in fluid communication both with the second inlet 242 of the fluidic cylinder 200 and the second inlet orifice 122a of the first routing device 120a,
 the outlet orifice 123a of the first routing device 120a is in fluid communication with the second inlet orifice 122b of the second routing device 120b, and
 the outlet orifice 123b of the second routing device 120b is in fluid communication with the first inlet 241 of the fluidic cylinder 200.

Each routing device 120a, 120b is configured so that it has a first so-called normal position and a second so-called protection position. In the normal position, the first inlet orifice 121a, 121b, is put into fluid communication with the outlet orifice 123a, 123b while the second inlet orifice 122a, 122b is closed. In the protection position, the second inlet orifice 122a, 122b is put into fluid communication with the outlet orifice 123a, 123b while the first orifice 121a, 121b is closed.

In any phase other than the flight phase, the first routing device 120a is kept in the normal position, the second routing device 120b being controlled depending on the position of the fluidic cylinder 200. In such a configuration shown in FIG. 1, regardless of the position of the fluidic cylinder 200 and therefore regardless of the position of the second routing device 120b, the first inlet 241 of the fluidic cylinder 200 is always in communication with the first fluid outlet 111 from the fluid source 110. Thus, the second fluid outlet 112 from the fluid source 110 is in fluid communication with the second inlet 242.

Supplying pressurised fluid through fluid outlets 111, 112 from the pressurised fluid source 110 provides a means of displacing the fluidic cylinder 200 regardless of the position of the fluidic cylinder 200.

When the first routing device 120a is electrically controlled to go into the protection position, usually during transition of the aircraft into the flight phase, the second inlet orifice 122b of the second routing device 120b is put into communication with the second chamber 232 through the part of the fluid network 100 that supplies the second chamber 232. Thus, when the fluidic cylinder 200 moves into the position in which it entrains the second routing device 120b into the protection position, the outlet orifice 123b of the second routing device 120b and therefore the first inlet 241 of the fluidic cylinder 200, are in fluid communication with the second inlet orifice 122b of the second routing device 120b and therefore with the second inlet 242.

The two fluidic cylinder inlets 241, 242 are therefore in fluid communication with each other, and therefore the pressure in the first and second chambers 231, 232 are identical. The operation of the fluidic cylinder 200 is therefore inhibited.

In this description and in the remainder of this document, inhibition of operation of the fluidic cylinder 200 refers to the fact that any supply of pressurised fluid to the fluidic cylinder 200 through the fluid network will not cause any movement of the fluidic cylinder 200.

Therefore, such a system will prevent control over the displacement of the fluidic cylinder 200 to a position beyond the position in which the second routing device 120b is displaced towards the protection position, when the first routing device 120a is being placed in the protection position.

On the other hand, these positions are accessible in other operating phases of the aircraft for which the first device 120a is placed in its normal position.

However, due to the use of two routing devices 120a, 120b, such a system is complex to use and requires special positioning of the second routing device 120b to bring it into mechanical connection with the fluidic cylinder 200.

PRESENTATION OF THE INVENTION

This invention is intended to overcome these disadvantages.

One of the purposes of the invention is to provide a turbomachine blade control system that is easier to adapt than prior art to secure the flight phase.

Another purpose of the invention is to provide a turbomachine blade control system capable of securing the flight phase and for which the layout is not constrained by the need for a routing device to be at least partially mechanically connected with an fluidic cylinder.

To achieve this, the invention relates to a turbomachine blade incidence control system comprising:
  a fluidic cylinder adapted to modify the incidence of a turbomachine blade, comprising a first upstream chamber and a second downstream chamber with first and second fluid inlets respectively,
  a pressurised fluid network adapted to selectively supply pressurised fluid to the first and/or the second fluidic cylinder chamber through the first and/or the second inlet, the fluid network comprising at least one fluid routing device adapted to modify the fluid supply to at least the first chamber, the routing device having a first so-called normal position in which the fluid supply to the first chamber is said to be normal, and a second so-called protection position in which the fluid supply to the first chamber is adapted to inhibit operation of the fluidic cylinder in a predefined so-called inhibit position, the fluidic cylinder comprising at least a third fluid inlet positioned to be in fluid communication with the first chamber when the fluidic cylinder is in the inhibit position, the routing device being adapted to set up a fluid communication between the third inlet and the second chamber through the fluid network when it is in the protection position, and to block the fluid supply to the third inlet when it is in the normal position.

As a reminder, inhibition of operation of the fluidic cylinder refers to the fact that no pressurised fluid supply to the fluidic cylinder through the fluid network can cause any fluidic cylinder movement.

Such a system enables making the flight phase secure by limiting risks of excursion of the fluidic cylinder beyond the inhibit position by the use of a third inlet in communication with the second chamber and by bringing the first and second fluidic cylinder chambers into communication. Unlike prior art, the system makes use of a single routing device. The system is thus simplified and its weight is reduced.

Preferably, the routing device is adapted so that when it is in the protection position, fluid communication can be set up between the third inlet and the second inlet through the fluid network.

Such communication between the fluidic cylinder third and second inlets simplifies the fluid circuit because there is no need to provide an additional inlet to create a fluid communication between the third inlet and the second chamber.

Advantageously, the fluidic cylinder comprises:
  a body at least partially delimiting a cavity forming the assembly composed of the first and the second chambers,
  a wall formed in the cavity to hermetically separate the first and second chambers, the wall being free to move relative to the body along a displacement axis, the wall having a position relative to the body called the inhibit position corresponding to the inhibit position of the fluidic cylinder, the third inlet being positioned axially in the fluidic cylinder so that the wall isolates the third inlet to the first chamber when the wall is in a position located upstream from the inhibit position, and the wall puts the third inlet into fluid communication with the first chamber when the wall is in the inhibit position.

Such a position of the third inlet can inhibit operation of the fluidic cylinder when the routing device is in the protection position, simply by the wall passing in front of the third inlet.

According to one embodiment of the invention, the third inlet is a fluid inlet orifice formed in the body and opening up in the cavity.

Preferably, the fluid inlet orifice comprises a plurality of openings formed along the wall of the cavity, said openings being distributed along a line along the wall of the cavity.

According to an alternative variant, the fluid inlet orifice is a groove formed in the body approximately perpendicular to the displacement axis along the wall of the cavity.

According to another variant of the invention, the body is free to move and will be connected to the blade such that the movement of the fluidic cylinder body modifies the incidence of the blade, the wall comprising a fluid circulation conduit in fluid communication with the routing device, said conduit being in fluid communication with the inlet orifice when the fluidic cylinder is in the inhibit position.

Such a fluid circulation conduit enables the design of a simpler pressurised fluid network during placement of a system using a ring type fluidic cylinder.

According to a second embodiment of the invention, the fluidic cylinder comprises an axial rod fixed to the body, the third inlet being a fluid inlet orifice formed in the rod and opening up into the cavity said rod preferably being a rotation prevention rod adapted to block the wall in rotation relative to the body.

Advantageously, the orifice comprises a plurality of openings distributed around the periphery of the rod.

According to one variant of the invention, the inlet orifice is a groove formed on at least part of the periphery of the rod.

Preferably, the rod comprises a fluid circulation conduit in fluid communication with the routing device and the inlet orifice.

Such a fluid conduit can provide a simpler fluid circuit, since part of the circuit is integrated into the rod.

The routing device is preferably a valve.

The invention also relates to a turbomachine comprising a blade and a blade incidence control system according to the invention.

Since such a turbomachine is simpler than the turbomachine according to prior art because it comprises a simpler blade control system, it has lower manufacturing costs and it is less likely to have a failure in the blade control system.

BRIEF DESCRIPTION OF THE DRAWINGS

This invention will be better understood after reading the description of example embodiments given solely for information and that are in no way limitative, with reference to the appended drawings in which.

Identical, similar or equivalent parts in different figures have the same numeric reference to facilitate comparison between different figures.

The different parts shown in the figures are not necessarily all at the same scale, to make the figures more easily readable

DETAILED PRESENTATION OF PARTICULAR EMBODIMENTS

Figure 1:
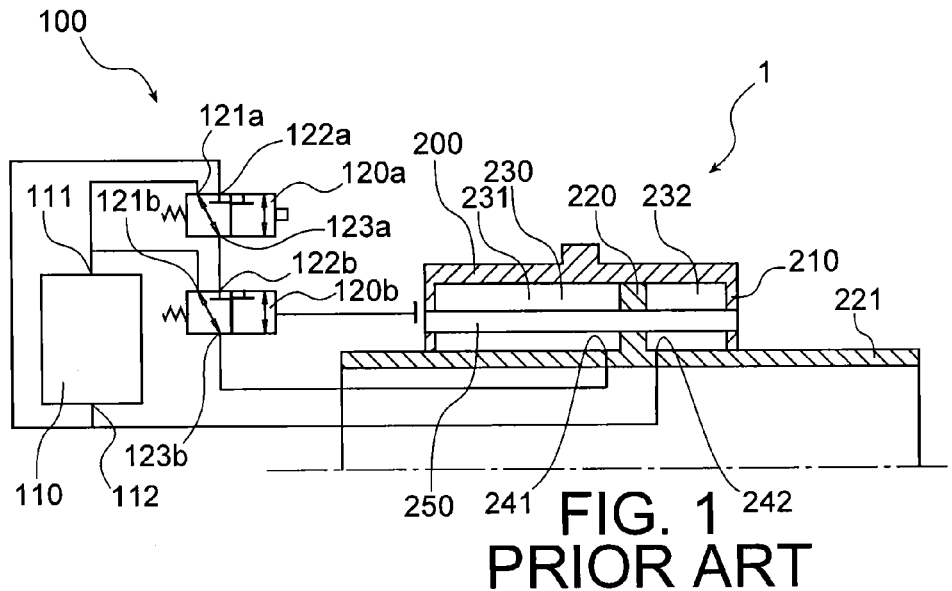
FIG. 1 shows a turbomachine blade incidence control system according to prior art.
Figure 2:
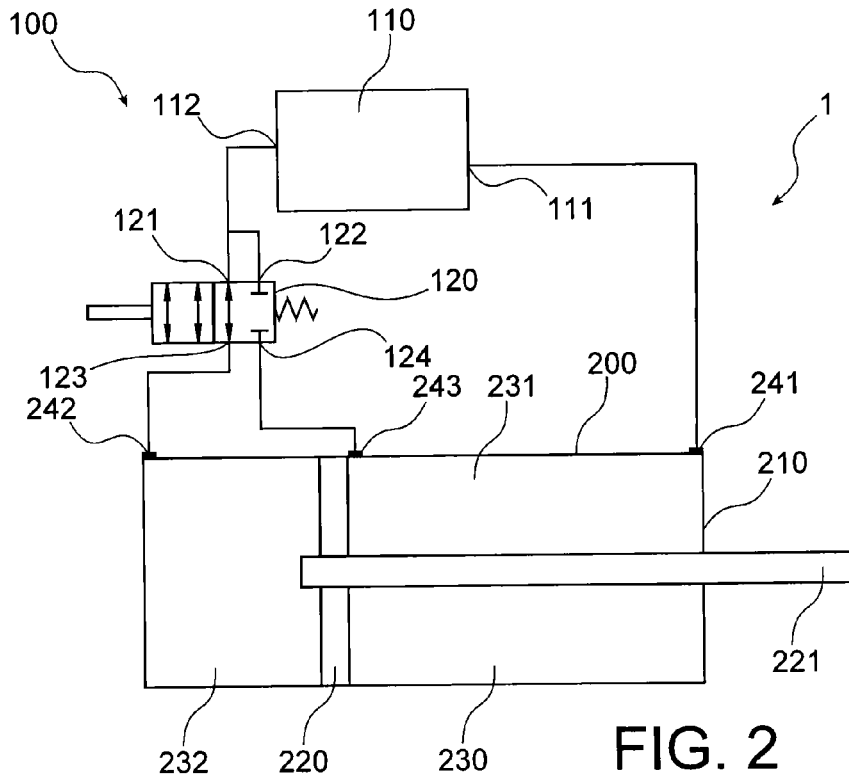
FIG. 2 shows a turbomachine blade incidence control system according to a first embodiment of the invention in which the fluidic cylinder comprises a third fluid inlet formed on the body of the fluidic cylinder.

FIG. 2 shows a turbomachine blade incidence control system 1 adapted to modify the incidence of at least one blade of a turbomachine propeller.

Such a system 1 comprises:
- an fluidic cylinder 200 adapted to modify the incidence of a turbomachine blade, the fluidic cylinder 200 comprising a first upstream chamber 231 and a second downstream chamber 232 provided with first and second fluid inlets 241, 242 respectively, the fluidic cylinder 200 also comprising a third fluid inlet 243,
- a pressurised fluid network 100 adapted to selectively supply pressurised fluid to the first and/or the second chamber 231, 232 through the first and/or the second fluid inlet 241, 242.

The fluidic cylinder 200 also comprises a body 210 delimiting a cavity 230. The body 210 has an approximately cylindrical shape with an axis of symmetry corresponding to the displacement axis of the fluidic cylinder. The cavity 230 is an approximately cylindrical cavity for which the axis of symmetry is approximately parallel to the displacement axis.

The cavity 230 forms the assembly of the first and the second chambers 231, 232. The first, second and third fluid inlets 241, 242, 243 open up into the cavity 230. The first fluid inlet 241 is located on the upstream side of the second and third fluid inlets 242, 243 close to the upstream end of the cavity 230. The second inlet 242 is downstream from the first and third inlets 241, 243, close to the downstream end of the cavity 230.

In this case, the third inlet 243 is a fluid inlet orifice opening up into the cavity 230. According to one variant embodiment of the invention, the third inlet 243 may be a groove formed on at least part of the periphery of the cavity 230 or a plurality of openings formed on the wall along a longitudinal line on the wall of the cavity 230.

The fluidic cylinder 200 also comprises a mobile wall 220 formed in the cavity 230 to hermetically separate the first and the second chambers 231, 232. The wall 220 is free to move in translation in the cavity 230 along the displacement axis of the fluidic cylinder 200. The axial dimension of the wall 220 is greater than the axial dimension of the inlet orifice, to prevent any fluid communication between the first and second chambers 231, 232 when the wall 220 crosses the inlet orifice.

In this way, when the chamber 220 is in a position upstream from the inhibit position, the wall 220 isolates the inlet orifice from the first chamber 231. When the wall 220 is in a so-called inhibit position in which it does not cover an upstream part of the inlet orifice, the inlet orifice is in fluid communication with the first chamber 231.

The fluidic cylinder 200 also comprises a shaft 221 fixed in movement to the wall 220. The shaft 221 partially fits into the cavity 230, and the remainder of the shaft that does not fit into the cavity 230 projects from the body through a passage formed in the body 210. This passage is practically hermetically sealed to limit fluid leaks in the cavity 230. The shaft 221 is mechanically connected to the blade so that movement of the assembly composed of the shaft 221 and the wall 220 modifies the incidence of the blade.

The fluidic cylinder 200 is supplied with fluid by means of the fluid network 100 through the first, second and third inlets 241, 242, 243.

To enable such a supply, the fluid network 100 comprises:
- a fluid source 110, such as a volumetric pump or a pressurised fluid outlet from the turbomachine, said fluid source 110 comprising at least first and second fluid outlets 111, 112, and
- one fluid routing device 120, such as an electrically-controlled valve.

The routing device 120 comprises first and second inlet orifices 121, 122 and first and second outlet orifices 123, 124.

The routing device 120 has a first so-called normal position in which the first inlet orifice 121 is in fluid communication with the first outlet orifice 123 and in which the second inlet and outlet orifices 122, 124 are hermetically closed.

The routing device 120 has a second so-called protection position in which the first inlet orifice 121 is in fluid communication with the first outlet orifice 123 and in which the second inlet orifice 122 is in fluid communication with the second outlet orifice 124.

The configuration of the fluid network 100 is as follows:
- the first fluid outlet 111 from the fluid source 110 is in fluid communication with the first inlet 241 of the fluidic cylinder 200,
- the second fluid outlet 112 from the fluid source 110 is in fluid communication both with the first and second inlet orifices 121, 122 of the routing device 120,
- the first outlet orifice 123 of the routing device 120 is in fluid communication with the second fluid inlet 242 of the fluidic cylinder 200,
- the second outlet orifice 124 of the routing device 120 is in fluid communication with the third fluid inlet 243 of the fluidic cylinder 200.

Thus during operation, the routing device 120 is put in the normal position when the aircraft on which the turbomachine is installed is in a phase in which all blade inclinations must be attainable, like the phase on the ground.

In this position, the first fluid outlet 111 from the fluid source 110 is in fluid communication with the first fluid inlet 241, and the second fluid outlet 112 of the fluid source 110 is in fluid communication with the second fluid inlet 242.

The third fluid inlet 243 is not supplied with fluid through the fluid network 100.

It is in fluid communication with the second outlet 124 from the routing device 120, and the second outlet orifice 124 is closed when the routing device 120 is in the normal position.

Thus, since the third inlet 243 is not supplied with fluid, the fluid supply to the fluidic cylinder 200 takes place only through the first and second fluid inlet 241, 242. Therefore the wall 220 is displaced over the entire stroke of the fluidic cylinder 200 by regulating the fluid output pressure from the first and second fluid outlets 111, 112 from the fluid source 110.

When the aircraft is in a phase in which a part of the stroke of the fluidic cylinder 200 has to be inhibited, like that corresponding to the "small pitch" configuration of the turbomachine blades, the routing device 120 is placed in the protection position.

Note that in this aircraft phase, the fluidic cylinder 200 is not in a position corresponding to the "small pitch" configuration of the blades, since this configuration is not compatible with the flight phase of the aircraft. The position configuration of the wall 250 of the fluidic cylinder 200 is a "large pitch" configuration, in other words the wall is located upstream from the third fluid inlet 243.

When the routing device 120 is in the protection position, the third inlet 243 is in fluid communication with the second inlet 242 of the fluidic cylinder 200 and therefore the second chamber 232.

When the wall 220 is upstream from the third inlet 243, the third inlet 243 opens up into the second chamber 232 and therefore has no influence on displacement of the wall 220 because the third inlet 243 puts the second chamber 232 into fluid communication with itself.

When the wall 220 is moved in the downstream direction as far as its inhibit position, the third inlet 243 then partially opens up into the first chamber 231. Thus, the third inlet 243 puts the first and second chambers 231, 232 into fluid communication, which creates an equilibrium of the fluid pressures applied in the first and second chambers 231, 232. This balancing of pressures balances pressure forces applied by the fluid on each side of the wall 220, thus making the positions on the downstream side of the inhibit position inaccessible simply by supplying pressurised fluid to the fluidic cylinder. Therefore, operation of the fluidic cylinder is inhibited.

Figure 3:
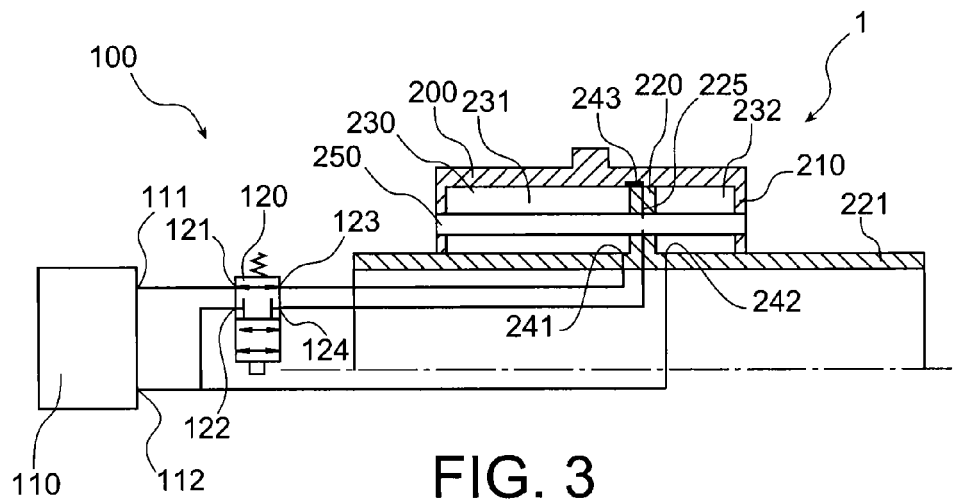
FIG. 3 shows a turbomachine blade incidence control system according to a second embodiment of the invention in which the fluidic cylinder is a ring type fluidic cylinder, the third fluid inlet being formed on the fluidic cylinder body.

FIG. 3 shows a system 1 according to a second embodiment. Such a system 1 is different from system 1 according to the first embodiment in that the fluidic cylinder 200 is a ring type fluidic cylinder for which the body 210 moves relative to the wall 220 and adjusts the inclination of the blade. According to this embodiment, the wall 220 comprises a fluid circulation conduit 225 that is in communication with the third inlet 243 when the fluidic cylinder 200 is in the inhibit position.

The fluid network 100 is also adapted for such a ring type fluidic cylinder 200.

The body 210 of the fluidic cylinder 200 is free to move along a shaft 221 fixed to the turbomachine. The body 210 has two passages for the shaft 221 at its two axial ends.

The cavity 230 has a generally annular shape. The wall 220 is a wall fixed to the shaft 221 that is cylindrical with a circular cross-section.

The fluidic cylinder 200 also comprises at least one rod 250 fixed to the body 210 that is adapted to block the body 210 in rotation relative to the wall 220. The rod 250 is approximately parallel to the displacement axis. The wall 220 comprises a passage for the rod 250.

The fluid network 100 comprises a fluid circulation conduit 225 formed in the wall 220, to enable fluid communication between the third inlet 243 and the second outlet orifice 124 from the routing device 120. The second outlet orifice 124 from the routing device 120 is in fluid communication with the fluid circulation conduit 225.

Thus, the configuration of the fluid network 100 according to this embodiment is as follows:
the first fluid outlet 111 from the fluid source 110 is in fluid communication with the first inlet orifice 121 of the routing device 120,
the second fluid outlet 112 from the fluid source 110 is in fluid communication both with the second inlet orifice 122 of the routing device 120 and the second fluid inlet 242 of the fluidic cylinder 200,
the first outlet orifice 123 from the routing device 120 is in fluid communication with the first fluid inlet 241 of the fluidic cylinder 200,
the second outlet orifice 124 from the routing device 120 is in fluid communication with the fluid circulation conduit 225.

As shown in FIG. 3, the inhibit position of the fluidic cylinder 200 according to this embodiment corresponds to a position of the body 210 in which the third inlet 243 is both in fluid communication with the first chamber 231 and with the fluid circulation conduit 225. Such an inhibit position corresponds to positioning of the body 210 relative to the wall 220 such that the wall 220 does not cover an upstream part of the third inlet 243.

Thus, communication of the third inlet 243 with the fluid circulation conduit 225 is effective only when the fluidic cylinder 200 is in the inhibit position.

The operating principle is exactly the same as that described for the first embodiment, except for this difference in fluid communication between the third inlet 243 and the fluid network 100 which only takes place when the fluidic cylinder 200 changes to the inhibit position.

Figure 4:
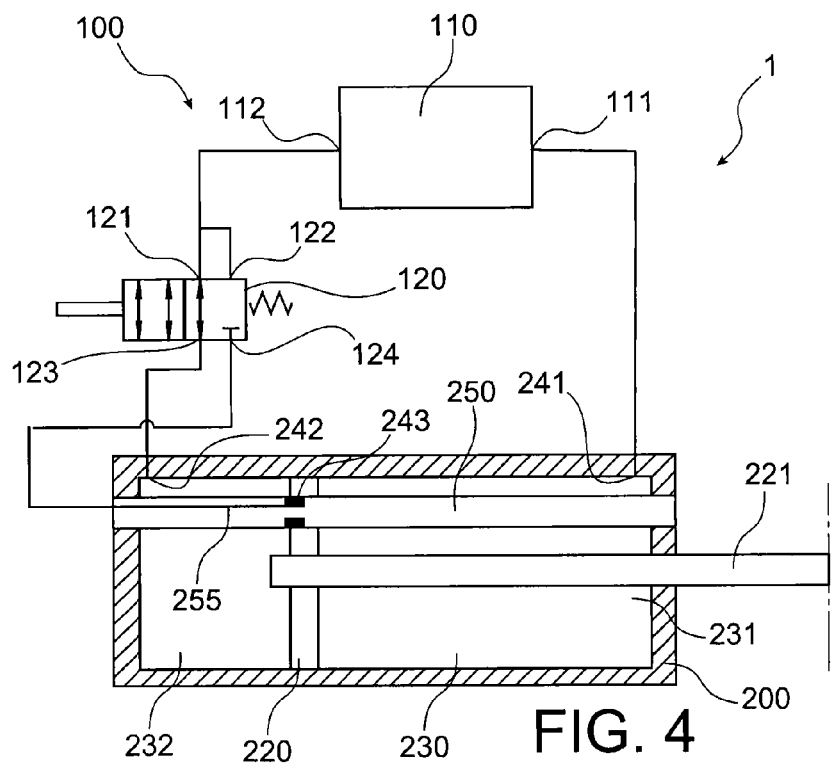
FIG. 4 shows an incidence control system according to a third embodiment of the invention in which the third fluid inlet is formed on a rotation prevention rod.

FIG. 4 shows a system 1 according to a third embodiment. The system 1 according to this third embodiment is different from the system 1 according to the first embodiment in that the fluidic cylinder 200 comprises a rod 250 fixed to the body 210 on which the third inlet 243 is formed and in that the rod 250 comprises a fluid circulation conduit 255.

The rod 250 is a rotation prevention rod adapted to block the wall 220 in rotation relative to the body 210. The rod 250 is approximately parallel to the displacement axis. The wall 220 comprises an orifice through which the rod 250 passes.

The rod 250 comprises the third inlet 243. The third inlet 243 may be formed by making a groove over at least part of the periphery of the rod 250. This third inlet 243 may also be composed of a series of openings formed on the periphery of the rod 250.

The fluid network 100 comprises a fluid circulation conduit 255 formed in the rod 250, to enable fluid communication between the third inlet 243 and the second outlet orifice 124 from the routing device 120. The second outlet orifice 124 from the routing device 120 is in fluid communication with the fluid circulation conduit 255.

In exactly the same way as in the first embodiment, the dimension of the wall 220 along the displacement axis is larger than the dimension of the third inlet 243. When the wall is in the inhibit position, it does not cover an upstream part of the third inlet 243 bringing the third inlet into fluid communication with the first chamber 231.

The operating principle of the system 1 according to this third embodiment is exactly the same as that for system 1 according to the first embodiment, and therefore it will not be described later.

Figure 5:
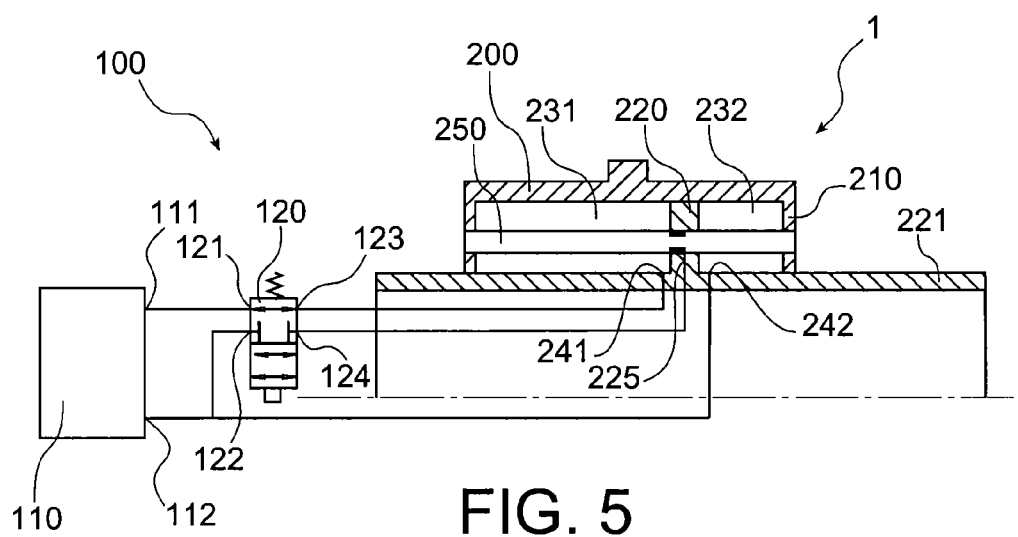
FIG. 5 shows an incidence control system according to a fourth embodiment of the invention in which the fluidic cylinder is a ring type fluidic cylinder and the third fluid inlet is formed on the rotation prevention rod.

FIG. 5 shows a system 1 according to a fourth embodiment.

System 1 according to this fourth embodiment is different from system 1 according to the second embodiment in that the third inlet 243 is formed on the rod 250.

The third inlet 243 is a fluid inlet orifice formed by a groove or a plurality of openings formed on the periphery of the rod 250.

The operating principle of a system 1 according to this fourth embodiment is exactly the same as that for system 1 according to the second embodiment.

In the third and fourth embodiments, the rod is a rod that also acts as a rotation prevention rod. It is also possible that the rod in which the fluid circulation conduit 255 is formed could be a rod additional to the rotation prevention rod(s) present in the fluidic cylinder, without going outside the scope of the invention.

In all the embodiments described above, the routing device 120 is a routing device comprising two inlet orifices 121, 122 and two outlet orifices 123, 124. It would be quite possible for the routing device 120 to comprise a single inlet orifice and a single outlet orifice without going outside the scope of the invention.

According to this possibility (not shown), the first outlet 111 from the fluid source 110 is in fluid communication both with the first inlet 241 of the fluidic cylinder 200 and the inlet orifice of the routing device, and the outlet orifice of the routing device is in fluid communication with the third inlet 243 of the fluidic cylinder 200.

When the routing device is in the normal position, the inlet orifice and the outlet orifice are both hermetically sealed, and in the protection position, the inlet orifice and the outlet orifice are in communication with each other.

We claim:

1. A turbomachine blade incidence control system, comprising:
    a fluidic cylinder adapted to modify the incidence of a turbomachine blade, comprising a first upstream chamber and a second downstream chamber with first and second fluid inlets respectively,
    a pressurised fluid network adapted to selectively supply pressurised fluid to the first and/or the second chamber of the fluidic cylinder through the first and/or the second inlet, the fluid network comprising at least one fluid routing device adapted to modify the fluid supply to at least the first chamber, the routing device having a first so-called normal position in which the fluid supply to the first chamber is said to be normal, and a second so-called protection position in which the fluid supply to the first chamber is adapted to inhibit operation of the fluidic cylinder in a predefined so-called inhibit position,
    wherein the fluidic cylinder comprises at least a third fluid inlet positioned to be in fluid communication with the first chamber when the fluidic cylinder is in the inhibit position, the routing device being adapted to set up a fluid communication between the third inlet and the second chamber through the fluid network when it is in the protection position, and to inhibit the fluid supply to the third inlet when it is in the normal position.

2. The system according to claim 1, in which the fluidic cylinder comprises:
    a body at least partially delimiting a cavity forming the assembly composed of the first and the second chambers,
    a wall formed in the cavity to hermetically separate the first and second chambers, the wall being free to move relative to the body along a displacement axis, the wall having a position relative to the body, called the inhibit position corresponding to the inhibit position of the fluidic cylinder,
    the third inlet being positioned axially in the fluidic cylinder so that the wall isolates the third inlet to the first chamber when the wall is in a position located upstream from the inhibit position, and the wall puts the third inlet into fluid communication with the first chamber when the wall is in the inhibit position.

3. The system according to claim 2, in which the third inlet is a fluid inlet orifice formed in the body and opening up in the cavity.

4. The system according to claim 3, in which the fluid inlet orifice comprises a plurality of openings formed along the wall of the cavity, said openings being distributed along a line along the wall of the cavity.

5. The system according to claim 3, in which the body is free to move and will be connected to the blade such that the movement of the body modifies the incidence of the blade, the wall comprising a fluid circulation conduit in fluid communication with the routing device, said conduit being in fluid communication with the inlet orifice when the fluidic cylinder is in the inhibit position.

6. The system according to claim 2, in which the fluidic cylinder comprises an axial rod fixed to the body, the third inlet being a fluid inlet orifice formed in the rod and opening up into the cavity, said rod preferably being a rotation prevention rod adapted to block the wall in rotation relative to the body.

7. The system according to claim 6, in which the orifice comprises a plurality of openings distributed around the periphery of the rod.

8. The system according to claim 6, in which the rod comprises a fluid circulation conduit in fluid communication with the routing device and the inlet orifice.

9. The system according to claim 1, in which the routing device is a valve.

10. A turbomachine comprising a blade and a blade incidence control system, wherein the system is a system according to claim 1.

* * * * *